United States Patent
Middendorf et al.

(10) Patent No.: US 7,235,996 B2
(45) Date of Patent: Jun. 26, 2007

(54) FUNCTIONALITY TEST METHOD

(75) Inventors: Joerg Middendorf, Neuenkirchen (DE); Ralf Hagedorn, Neuenkirchen (DE)

(73) Assignee: General Electric Company, Schenectady, NY (US)

( * ) Notice: Subject to any disclaimer, the term of this patent is extended or adjusted under 35 U.S.C. 154(b) by 62 days.

(21) Appl. No.: 11/282,128

(22) Filed: Nov. 18, 2005

(65) Prior Publication Data

US 2007/0115020 A1    May 24, 2007

(51) Int. Cl.
*G01R 31/26*    (2006.01)
(52) U.S. Cl. .................. 324/765; 324/73.1; 324/158.1
(58) Field of Classification Search ...................... None
See application file for complete search history.

(56) References Cited

U.S. PATENT DOCUMENTS

| | | | |
|---|---|---|---|
| 3,726,132 A | 4/1973 | Bibby et al. | |
| 3,916,683 A | 11/1975 | Felger et al. | |
| 4,558,569 A | 12/1985 | Hwang et al. | |
| 4,635,209 A | 1/1987 | Hwang et al. | |
| 4,854,120 A | 8/1989 | Nelson et al. | |
| 6,653,827 B2 | 11/2003 | Gaither et al. | |
| 2005/0116552 A1 | 6/2005 | Safonov | |

*Primary Examiner*—Minh N. Tang
(74) *Attorney, Agent, or Firm*—James E. McGinness, Esq.; Armstrong Teasdale LLP

(57) ABSTRACT

A functionality test method for a technical system having at least one technical component to be regularly tested. The method including the steps of defining a test interval by setting a minimum time interval and a maximum time interval between two successive tests of the technical component, defining a test range for a decision parameter, sensing an actual value of the decision parameter, and performing a functionality test of the technical component if the minimum time interval between two successive tests of the technical component has elapsed and the sensed actual value of the decision parameter is within the predefined test range, or the maximum time interval between two successive tests of the technical component has elapsed.

11 Claims, 6 Drawing Sheets

FUNCTIONALITY TEST METHOD

BACKGROUND OF THE INVENTION

This invention relates generally to a method for performing a functionality test of a technical component in a technical system.

Technical systems often include a plurality of individual technical components. To obtain troublefree operation of the technical system or to detect failures or wear of the components, functionality tests of the components are performed in regular intervals. These functionality tests are especially important for components which are relevant for the operational safety of the technical system, e.g. emergency shut-down systems. Also, there exist legal directives prescribing functionality tests at certain intervals.

However, due to the nature of the functionality test the normal operation of the technical system has to be interrupted. Accordingly, the technical system is not available during the duration of the test procedure of the technical component. For example, power generation systems that have to be shut-down for a component test will not produce power during the test procedure, thus reducing the efficiency of the power generation system.

Furthermore, the technical systems are often complex in that they include a plurality of different technical components. Typically, the regular time interval between two successive tests is different for each type of component so that the total number of functionality tests for the technical system may become high. This, however, reduces the average time of normal operation of the technical system between two successive tests. Accordingly, the efficiency of the system is reduced.

The above problems are particularly relevant to wind turbines. Typically, wind turbines are located at remote sites and subject to harsh climate. Therefore, functionality tests of wind turbine components are important to guarantee reliable operation. Furthermore, maintenance costs for remote turbine sites are relatively high so that it is desirable to reduce the frequency of such maintenance procedures.

BRIEF DESCRIPTION OF THE INVENTION

In view of the above, a functionality test method for a technical system is provided. The system including at least one technical component to be regularly tested. The method including the steps of defining a test interval by setting a minimum time interval and setting a maximum time interval between two successive tests of the technical component, defining a test range for a decision parameter, sensing an actual value of the decision parameter, and performing a functionality test of the technical component if the minimum time interval between two successive tests of the technical component has lapsed and the sensed actual value of the decision parameter is within the predefined test range, or the maximum time interval between two successive tests of the technical component has lapsed.

DETAILED DESCRIPTION OF THE INVENTION

Figure 1:
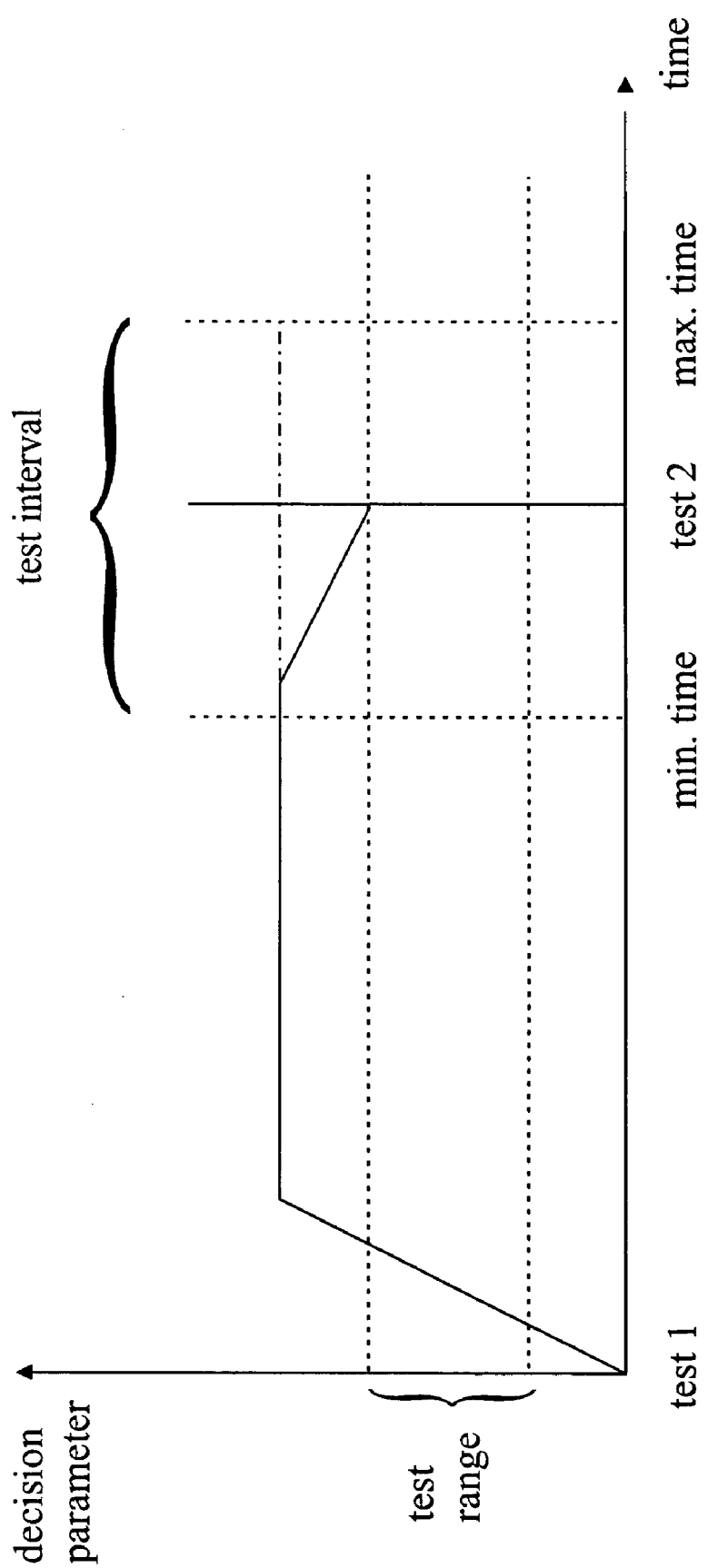
FIG. 1 is a time scheme of a functionality test procedure according to an embodiment of the present invention.
Figure 4:
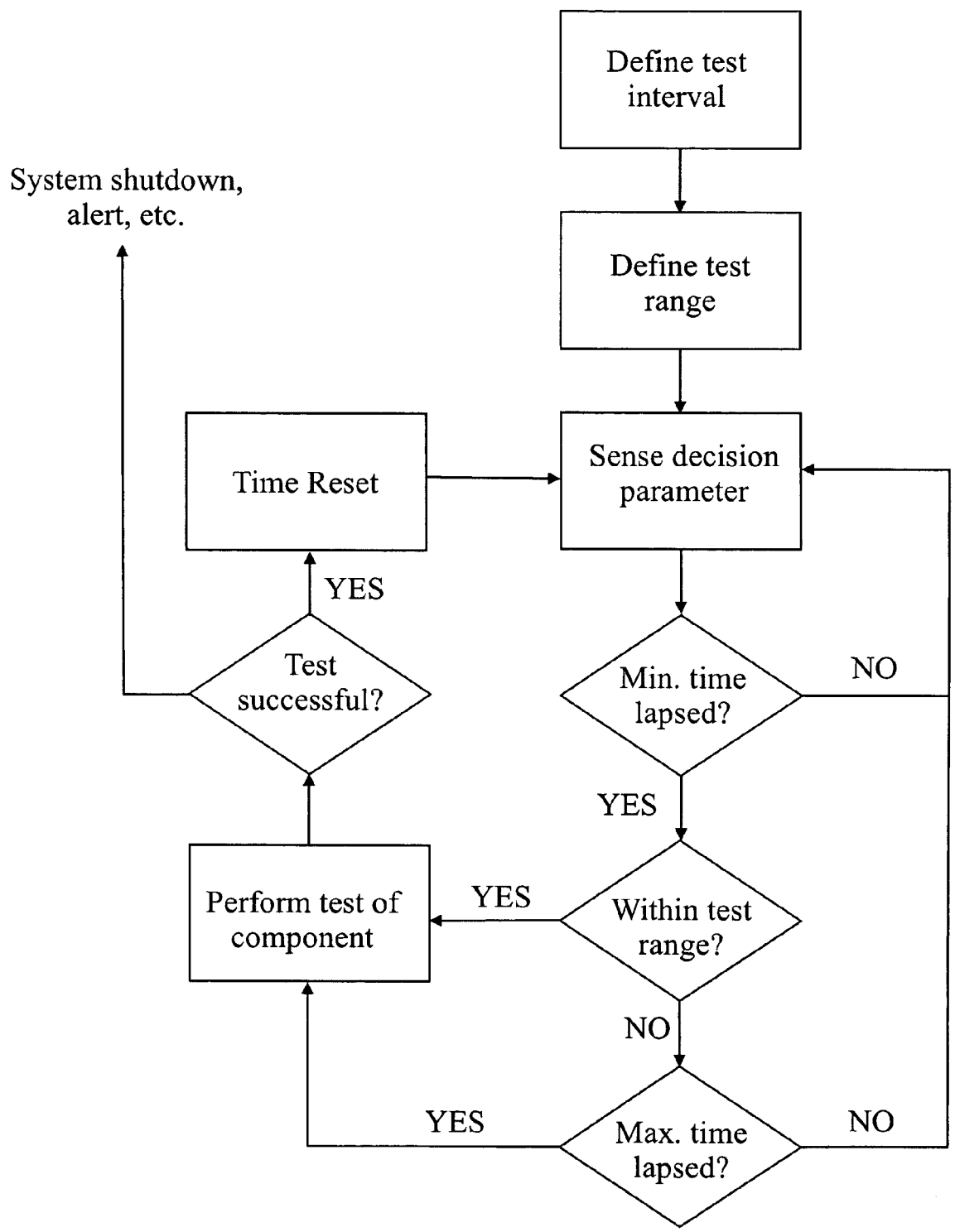
FIG. 4 is a flow chart of a functionality test procedure according to an embodiment of the present invention.

FIG. 1 is a time scheme of a functionality test procedure according to an embodiment of the present invention. Therein, the value of a decision parameter versus time is shown. As an example, the input power of a wind turbine is selected as the decision parameter. Furthermore, as an example the technical component to be tested is a battery for an emergency pitch drive and the mechanical power input into the generator is selected as a decision parameter. However, it should be understood that the following explanations are not restricted to wind turbines, a battery test or to input power. It should be apparent to one skilled in the art how the following explanations may apply to other technical systems and/or components and/or other decision parameters. Furthermore, FIG. 4 shows a flow chart of the functionality test method and should be referred to when reading the explanations below.

First, a maximum time interval between two successive tests is defined which corresponds to a regular interval for that case. Then, a minimum time is set which defines the earliest time when the successive functionality test can be performed. Thus, a test interval for performing a functionality test is defined by the minimum time as a lower limit and the maximum time as an upper limit. Furthermore, a decision parameter, e.g. input power, is selected and a test range is defined by upper and lower limits. In an exemplary embodiment, the upper and lower limits have the same value so that only one threshold value for releasing the test procedure is defined.

The following example is used to exemplify the system behavior according to the test method. Of course, the actual behavior of the wind turbine depends on the actual wind conditions and may be different from the example shown in FIG. 1. However, the principles underlying the present invention are apparent from FIG. 1. Initially, a test test1 is performed and afterwards the decision parameter, i.e. the input power, rises until it reaches a nominal operational value. At the minimum time, the minimum time interval since test1 has elapsed. However, the input power decision parameter has a value above the upper limit of the test range so that no functionality test is initiated. At some time, the input power decreases and when it reaches the upper limit of the test range, both time and parameter conditions are simultaneously fulfilled so that the successive functionality test test2 is initiated. Thus, the functionality test is performed at an operational condition with low or lower input power. Accordingly, the efficiency loss due to the down time during the test is less than if the test is performed during a period of maximum input power.

FIG. 1 shows an alternative case in dash-dotted lines. In this alternative case, the input power does not decrease but remains at its maximum. Accordingly, no functionality test is performed within the test interval and only occurs when the maximum time interval has lapsed, i.e. at max. time. This test is performed without any boundary condition on the decision parameter, i.e. independent thereof. Thus, a maximum time interval between successive functionality tests is not exceeded.

After each successful functionality test a time reset is accomplished and the above described cycle of sensing and comparing starts again. If the test is not successful, i.e. a failure of the component is detected, at least one of a system shutdown is initiated, an alert is sent to an operator or other suitable measures are taken.

Although the test method has been described with reference to wind turbines and input power, in alternative embodiments, the decision parameter is be selected from at least one of power output of the technical system, torque, speed, vibrational state, wind speed, icing, pitch angle of the rotor blades. In other embodiments, the technical system is any other suitable system including a technical component to be tested.

Figure 2:
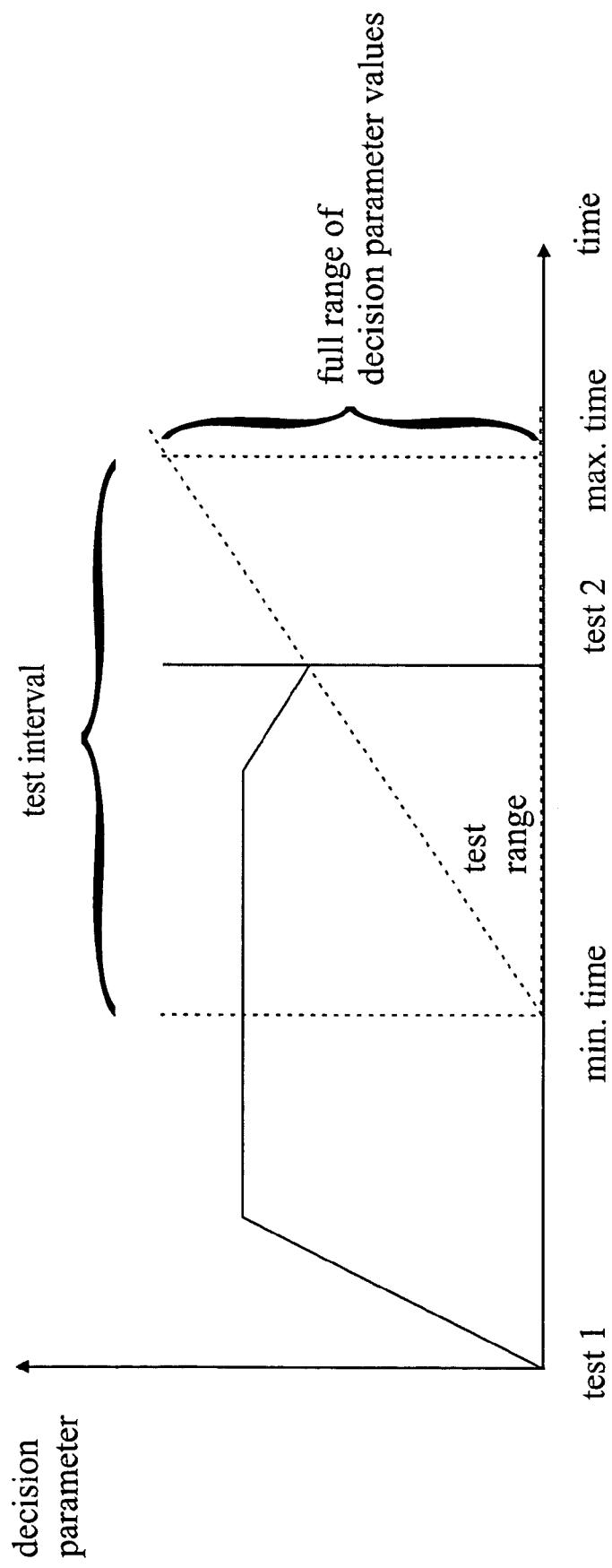
FIG. 2 is a time scheme of a functionality test procedure according to a further embodiment of the present invention.

A further embodiment of the present invention is now described with reference to FIG. 2. Since the basic principle is the same as described above, redundant features are omitted. One difference is that the test range is time-dependent, namely dynamically expanding in FIG. 2. However, it should be understood that the time-dependency of the test range may have any suitable shape, i.e. even decreasing portions. Furthermore, in the present example the test range starts at minimum time from the lowest possible value of the decision parameter, which is zero input power, and expands over the full range of possible decision parameter values at the maximum time. In other words, a functionality test will only be initiated at minimum time if there is no input power into the system but will be initiated at any actual input power when the maximum time is reached.

Accordingly, the decision criterion whether to initiate a functionality test is very strict at minimum time, e.g. 0% of the decision parameter range in the present example, and increasingly relaxes up to maximum time, i.e. 100% of the decision parameter range in the present example, where a functionality test is initiated independent of the operational state of the system. Thus, a tradeoff between the timely urge to perform the functionality test and the efficiency loss due to the test is implemented. As a result, efficiency of the technical system is further improved.

Figure 3:
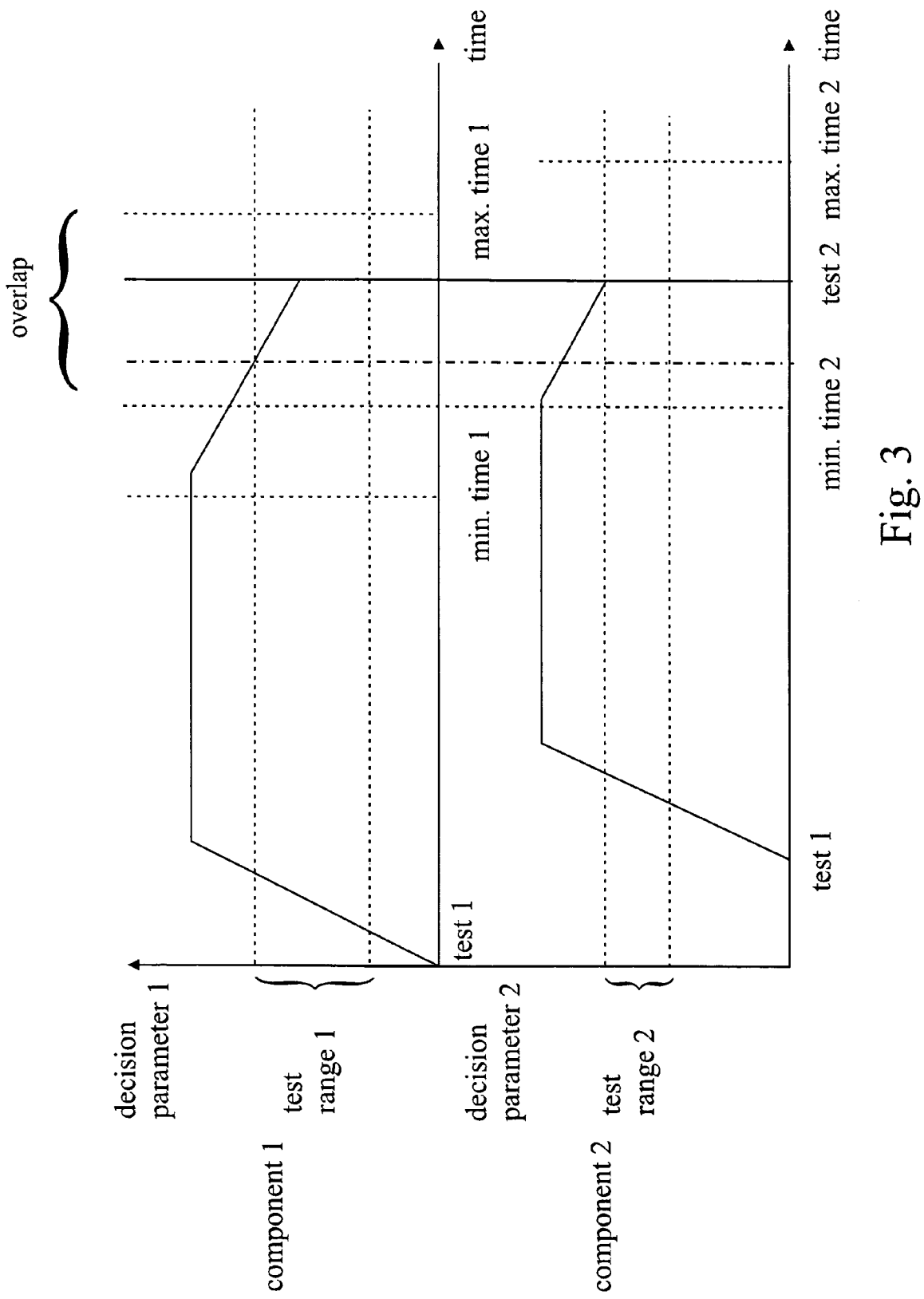
FIG. 3 is a time scheme of a functionality test procedure according to another embodiment of the present invention.

Another embodiment of the present invention is described with reference to FIG. 3. As depicted in FIG. 3, a time scheme of a test method for a technical system comprising two different technical components is shown. The test intervals, decision parameters and/or test ranges for the components depend on the component specifications and will, therefore, be different for components 1 and 2. The method is also applicable if one or more of these features are identical for the components.

As shown in FIG. 3, the minimum time for component 1 lies prior to min. time 2 for component 2 and the maximum time for component 1 lies prior to max. time 2 for component 2. However, the minimum time for component 2 (min. time 2) lies within the test interval for component 1 so that a time overlap between the test intervals for components 1 and 2 exists. In the example shown in FIG. 3, the boundary conditions for both components are linked by a Boolean AND operation. Therefore, no functionality test of component 1 is initiated when decision parameter 1 crosses the upper limit of test range 1 (dash-dotted line). Only when decision parameter 2 crosses the upper limit of test range 2, is the successive test of both components is initiated so that both components are tested at the same time. Thus, efficiency is further increased since only one down time for the system is required instead of two. As a further option, a functionality test for component 2 may be initiated if the maximum time for component 1 is reached without a functionality test being performed in the test interval of component 1.

According to a further embodiment of the present invention, a successful use of a technical component is accepted as a successful functionality test. This option may be applied in any of the above described embodiments. A successful use of the component means that the component has been used without inherited errors. If a successful use of the component is interpreted as a successful functionality test, further testing of the component for the present test cycle is not undertaken. Therefore, a time reset for the technical component is accomplished and the test cycle starts again. It is important to understand that not only successful uses of a component within a corresponding test interval for the component are considered but each successful use, such as successful uses occurring prior to the minimum time for the component are considered. For example, if the battery of a pitch drive is activated due to a fault state of the wind turbine and no error with respect to the battery system occurs, the successful use of the battery is considered as a successful functionality test even if the fault state occurs prior to the lapse of the minimum test interval. Thus, efficiency is further increased since the time intervals between explicit functionality tests is increased.

According to another aspect of the present invention, a wind turbine connected to a wind turbine management system (WTMS) is provided, wherein the WTMS is adapted to perform a functionality test method as described above.

Figure 5:
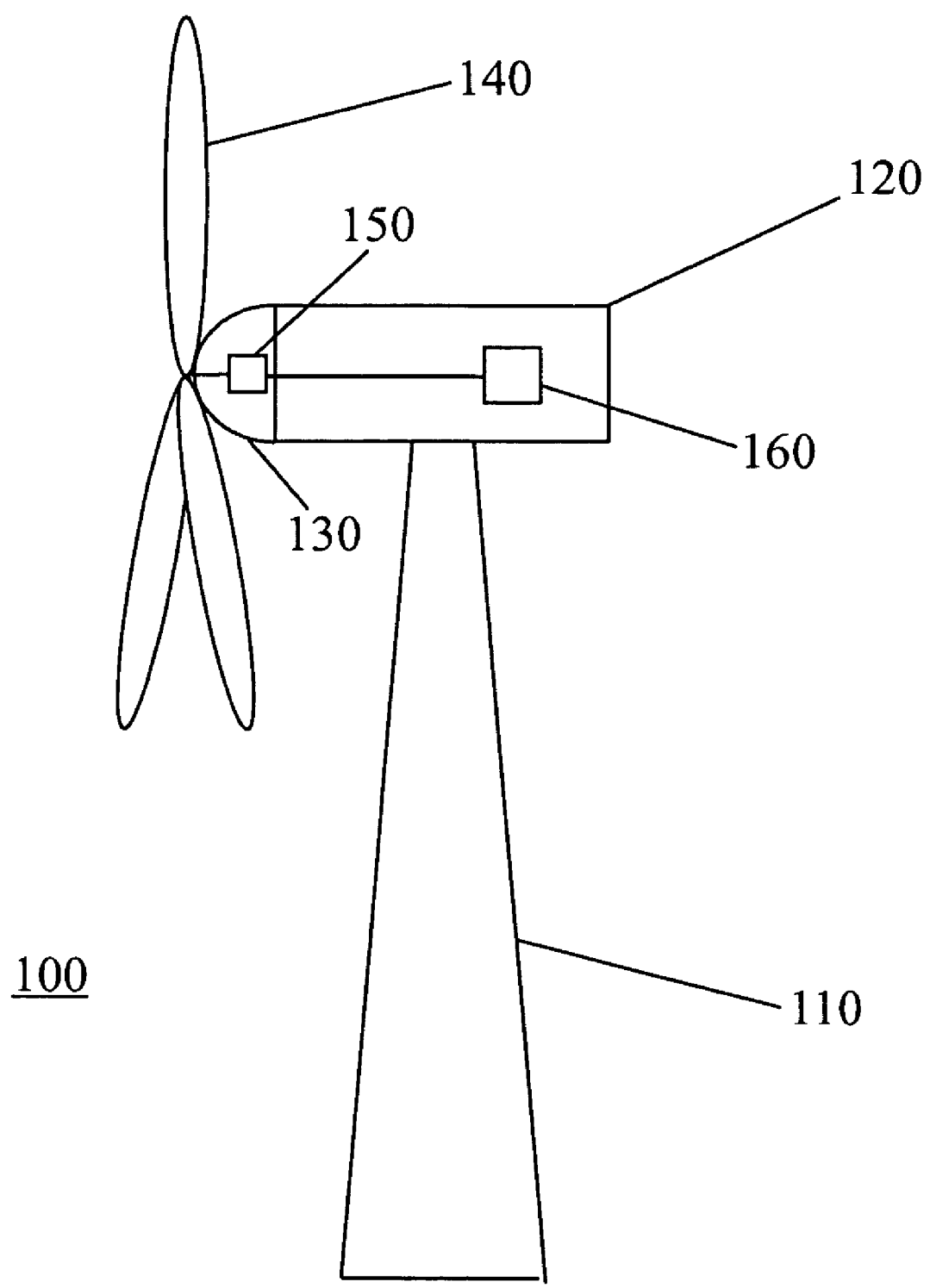
FIG. 5 is a schematic view of a wind turbine according to another aspect of the present invention.

An example of such a wind turbine is shown in FIG. 5. Therein, a wind turbine 100 comprises a tower 110 and a nacelle 120 to which a hub 130 is mounted. Rotor blades 140 are mounted on hub 130. A pitch drive system 150 is disposed within hub 130 and is connected to a wind turbine management system 160. Typically, pitch drive system 150 includes a battery-driven emergency drive system which has to undergo functionality tests in regular intervals since failure of the emergency pitch drive may cause damage or even destruction of the wind turbine. In wind turbine 100, the WTMS 160 is adapted to perform one of the above described functionality test methods on the battery-driven emergency pitch drive 150. Thus, the efficiency of wind turbine 100 is increased with respect to conventional wind turbines.

Figure 6:
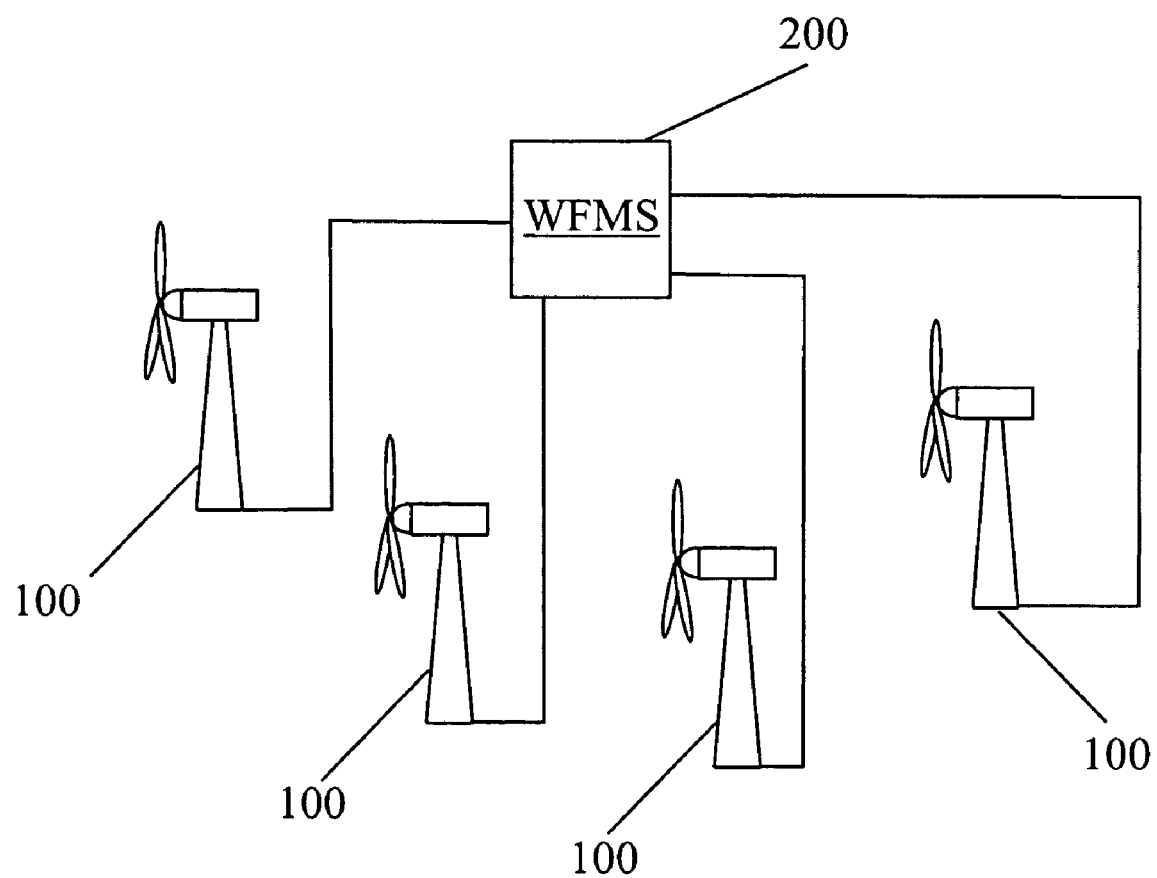
FIG. 6 is a schematic view of a wind turbine according to a further embodiment of the present invention.

A further example of wind turbines employing one of the above described functionality test methods is shown in FIG. 6. Therein, a plurality of wind turbines 100 is grouped together to form a wind farm. Each turbine within the wind farm is connected to a centralized wind farm management system (WFMS) 200 which is adapted to perform a functionality test method as described above. Particularly, the WFMS may be adapted to coordinate the functionality tests of the wind turbines 100 included within the wind farm so that down times and/or power losses due to testing are coordinated and/or evenly distributed across the turbines. As a result, the overall efficiency of the wind farm is increased.

Having thus described the invention in detail, it should be apparent for a person skilled in the art that various modifications can be made in the present invention without departing from the spirit and scope of the following claims. In particular, although the present invention has been described with respect to power generating systems like wind or water turbines, it is apparent for the skilled artisan that fuzzying the regular time interval between two successive component tests and defining a decision criterion for testing the component prior to the regular date can also be employed in various other technical systems.

While the invention has been described in terms of various specific embodiments, those skilled in the art will recognize that the invention can be practiced with modification within the spirit and scope of the claims.

What is claimed is:

1. A functionality test method for a technical system, the system including at least one technical component to be regularly tested, the method comprising the steps of:
   defining a test interval by setting a minimum time interval and a maximum time interval between two successive tests of the technical component;
   defining a test range for a decision parameter;
   sensing an actual value of the decision parameter; and
   performing a functionality test of the technical component if the minimum time interval between two successive tests of the technical component has elapsed and the sensed actual value of the decision parameter is within the predefined test range, or the maximum time interval between two successive tests of the technical component has elapsed.

2. The test method according to claim 1 wherein the decision parameter is selected from at least one of power input to the technical system, power output of the technical system, torque, speed, vibrational state, grid failure, grid overvoltage, and grid undervoltage.

3. The test method according to claim 1 wherein the test range of the decision parameter is time-dependent.

4. The test method according to claim 3 wherein the test range continuously increases during the test interval.

5. The test method according to claim 4 wherein the test range increases from 0% to 100% of a decision parameter range during the test interval.

6. The test method according to claim 1 wherein a successful use of the technical component is accepted as a successful functionality test of the technical component and a time reset is accomplished.

7. The test method according to claim 1 wherein the technical system comprises at least one further technical component to be tested, said method further comprising the steps of:
   checking whether the test intervals of the technical components overlap; and
   scheduling a functionality test within the overlap of the test intervals of the technical components.

8. The test method according to claim 1 wherein the technical system is a wind turbine.

9. The test method according to claim 8 wherein the decision parameter is at least one of wind speed, icing, and pitch angle of the rotor blades.

10. The test method according to claim 1 wherein the decision parameter is a vector having at least two components selected from the group of power input to the technical system, power output of the technical system, torque, speed, vibrational state, wind speed, icing, and pitch angle of the rotor blades.

11. A wind turbine connected to a wind turbine management system which is adapted to perform a functionality test method according claim 1.

* * * * *